United States Patent
Rune

(10) Patent No.: US 9,930,653 B2
(45) Date of Patent: Mar. 27, 2018

(54) OVERLOAD CONTROL IN A COMMUNICATION NETWORK

(71) Applicant: Telefonaktiebolaget L M Ericsson (publ), Stockholm (SE)

(72) Inventor: Johan Rune, Lidingö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 108 days.

(21) Appl. No.: 14/646,657

(22) PCT Filed: Nov. 30, 2012

(86) PCT No.: PCT/SE2012/051332
§ 371 (c)(1),
(2) Date: May 21, 2015

(87) PCT Pub. No.: WO2014/084766
PCT Pub. Date: Jun. 5, 2014

(65) Prior Publication Data
US 2015/0304999 A1    Oct. 22, 2015

(51) Int. Cl.
*H04W 72/04*    (2009.01)
*H04W 4/00*    (2018.01)
*H04W 74/00*    (2009.01)
*H04W 74/08*    (2009.01)

(52) U.S. Cl.
CPC ......... *H04W 72/042* (2013.01); *H04W 4/005* (2013.01); *H04W 74/006* (2013.01); *H04W 74/0833* (2013.01)

(58) Field of Classification Search
CPC ............. H04W 4/005; H04W 74/0833; H04W 74/006; H04W 72/042; H04W 72/00; H04W 28/02–28/0289; H04W 74/002
See application file for complete search history.

(56) References Cited

U.S. PATENT DOCUMENTS

| | | | |
|---|---|---|---|
| 2007/0105561 A1* | 5/2007 | Doetsch | H04W 72/082 455/450 |
| 2009/0238141 A1 | 9/2009 | Damnjanovic et al. | |
| 2009/0303896 A1* | 12/2009 | Che | H04W 74/006 370/252 |

(Continued)

FOREIGN PATENT DOCUMENTS

WO    WO 2012/116605    *    9/2012    ............ H04W 48/06

OTHER PUBLICATIONS

International Search Report for International Application No. PCT/SE2012/051332, dated May 14, 2013, 3 pages.

(Continued)

*Primary Examiner* — Edan Orgad
*Assistant Examiner* — Ivan O Latorre
(74) *Attorney, Agent, or Firm* — NDWE LLP

(57) ABSTRACT

A method, a radio network node and user equipment (UE) suitable for overload control in a communication network are disclosed. The method comprises, when an overload condition is determined by a radio network node, including an overload indicator (OI) in a MAC PDU to be transmitted to the UE and thereby indicating to the UE that transmission resources for the UE will be allocated at a later point in time, e.g. when there is no longer any overload condition.

29 Claims, 9 Drawing Sheets

(56) References Cited

U.S. PATENT DOCUMENTS

| | | | | |
|---|---|---|---|---|
| 2010/0057485 A1* | 3/2010 | Luft | ................. | H04W 4/00 455/411 |
| 2010/0202288 A1* | 8/2010 | Park | ................. | H04W 48/08 370/230 |
| 2010/0238859 A1* | 9/2010 | Vukovic | ................. | H04W 74/0833 370/328 |
| 2010/0316016 A1* | 12/2010 | Kim | ................. | H04W 74/002 370/329 |
| 2011/0038264 A1* | 2/2011 | Ishii | ................. | H04L 47/10 370/238 |
| 2011/0170503 A1* | 7/2011 | Chun | ................. | H04W 74/006 370/329 |
| 2012/0033554 A1* | 2/2012 | Shiva | ................. | H04W 28/0205 370/235 |
| 2012/0051297 A1* | 3/2012 | Lee | ................. | H04W 74/006 370/329 |
| 2012/0082088 A1* | 4/2012 | Dalsgaard | ................. | H04L 12/4625 370/315 |
| 2012/0082099 A1 | 4/2012 | Bienas et al. | | |
| 2012/0093109 A1* | 4/2012 | Dong | ................. | H04W 74/008 370/329 |
| 2012/0163169 A1* | 6/2012 | Yang | ................. | H04W 28/0205 370/230 |
| 2012/0287865 A1* | 11/2012 | Wu | ................. | H04W 74/006 370/329 |
| 2013/0028216 A1* | 1/2013 | Baldemair | ................. | H04L 5/003 370/329 |
| 2013/0242730 A1* | 9/2013 | Pelletier | ................. | H04W 28/0284 370/230 |
| 2013/0336301 A1* | 12/2013 | Deng | ................. | H04W 72/1289 370/336 |

OTHER PUBLICATIONS

ZTE: "Backoff enhancements for RAN overload control," 3GPP TSG RAN WG2 #73bis, R2-112863, May 9-13, 2011, 1-7. Pages.

LG Electronics Inc: "Random Access Overload Control for MTC," 3GPP TSG-RAN WG2 #73bis, R2-112372, Apr. 11-15, 2011, pp. 1-2.

3rd Generation Partnership Project; Technical Specification Group Radio Access Network; Evolved Universal Terrestrial Radio Access (E-UTRA); Physical layer procedures (Release 11), 3GPP TS 36.213 V11.0.0, (Sep. 2012), pp. 1-143.

3rd Generation Partnership Project; Technical Specification Group Radio Access Network; Evolved Universal Terrestrial Radio Access (E-UTRA); Medium Access Control (MAC) protocol specification (Release 10), 3GPP TS 36.321 V10.5.0, (Mar. 2013), pp. 1-54.

* cited by examiner

OVERLOAD CONTROL IN A COMMUNICATION NETWORK

CROSS-REFERENCE TO RELATED APPLICATIONS

This application is a National stage of International Application No. PCT/SE2012/051332, filed Nov. 30, 2012, which is hereby incorporated by reference.

TECHNICAL FIELD

Embodiments of the present invention presented herein generally relate to communication networks and, more particularly, to overload control in such networks.

BACKGROUND

Detailed descriptions of communication networks and systems can be found in literature, such as in Technical Specifications published by, e.g., the $3^{rd}$ Generation Partnership Project (3GPP). In such systems, user equipments (UE) can, e.g., access mobile services via an access network comprising a Radio Access Network (RAN) and a Core Network (CN). Examples of 3GPP-based communication networks include, for example, 2G GSM/GPRS (Global System for Mobile Communications/General Packet Radio Services), 3G UMTS (Universal Mobile Telecommunications System), and LTE (Long Term Evolution) EPS (Evolved Packet System). Examples of radio access networks (RAN) include GERAN (GSM/EDGE (Enhanced Data rates for GSM Evolution) RAN for 2G GSM/GPRS), UTRAN (Universal Terrestrial RAN for 3G UMTS), and E-UTRAN (Evolved UTRAN for LTE EPS). Examples of packet core networks include GPRS Core (for 2G and 3G) and Evolved Packet Core (for 2G, 3G UTRAN and E-UTRAN).

In communication systems, such as those mentioned above, a potential problem is that a number of UEs and/or other devices may simultaneously require communication network resources. This may induce a congestion or overload of network resources, which may potentially have serious consequences as the communication system may no longer be able to function properly or sufficiently well.

This problem of congestion or overload is becoming increasingly important in particular with the introduction in communication networks of Machine Type Communication (MTC), also sometimes referred to as Machine-to-Machine Communication (M2M), for example as currently specified by standardization bodies such as the 3GPP, see for example 3GPP TS 22.368 V.12.0.0 (2012 September). As is known among persons skilled in this art, MTC is a form of data communication which involves one or more MTC devices that do not necessarily involve human interaction. As is also known among persons skilled in this art, MTC devices is an example of a UE. In other words, MTC devices constitute a subset of the term UE.

With the introduction of MTC in communication systems such as those described hereinabove, the potentially large number of MTC devices and the nature of MTC may pose challenges on the communication networks. For example, access control signaling resources become particularly exposed in some scenarios. For example, some scenarios include MTC devices in the form of sensor devices which monitor states of technological systems (e.g. industrial systems) or processes or sensor devices monitoring various environmental conditions such as temperature, pressure and vibrations. For such MTC devices (and the applications where these MTC devices are utilized) external events such as power grid failure, a pipeline damage, an earthquake or an industrial process failure may trigger a large amount of MTC devices wanting to access the communication network simultaneously, or substantially simultaneously, for the purpose of reporting the triggering events to their respective application servers. When a large number of MTC devices require network resources simultaneously, or substantially simultaneously, there is an increased risk of congestion or overload in the communication network. In addition to the above example scenario seen with respect to MTC devices, overload may of course also be caused by non-MTC devices, e.g. UEs that do involve human interaction. Such non-MTC devices may e.g. include devices such as cellphones, smartphones, tablet computers, gaming devices, personal digital assistants (PDAs), etcetera. To sum up, when a large number of UEs and/or MTC devices require network resources simultaneously, or substantially simultaneously, there is an increased risk of congestion or overload in the communication network.

A known means for protecting the network access resources from overload in an LTE cell is known as the Access Class Barring (ACB) mechanism. For the purpose of this mechanism, each UE is a member of at least one Access Class (AC), which is stored in the USIM. An eNB may announce the ACB state in each cell through the broadcast system information (SI). System Information Block Type 2 (SIB 2) of the SI lists the state of each AC through an Access Class Barring Factor (ACBF) associated with each AC, which has a value between 0 and 1. When a UE finds an AC in the SI which corresponds to one stored in the USIM, the UE generates a random value between 0 and 1. If the random value is lower than the ACBF of the concerned AC, the UE considers the cell as barred, i.e. it is not allowed to access it, for a random time period with a mean value governed by the Access Class Barring Time (ACBT) parameter included in the SI (in SIB 2). With the particular nature of MTC devices in mind the 3GPP is currently working on an extension of the ACB concept, called Extended Access Barring (EAB). EAB is a mechanism for the operator(s) to control mobile originating access attempts from UEs that are configured for EAB in order to prevent overload of the access network and/or the core network. In overload situations, the operator can restrict access from UEs configured for EAB while permitting access from other UEs.

Sometimes the ACB/EAB mechanism is not enough to protect a cell from overload. This may, for example, be because the mechanism is slow to react to changes due to the pressure on the network access resources (because it relies on the rather infrequently transmitted system information), e.g. during sudden surges of access attempts from MTC devices which are more or less synchronized for one reason or the other (as exemplified above). It may also be because the chosen ACB/EAB parameters were not appropriate to handle the number of access attempts or because ACB/EAB was not used at all.

Another method for access load control is known from the US patent application publication US 2012/0163169 A1, which was published on 28 Jun. 2012. This publication describes an overload control apparatus and method for a MTC type communication service. The method described in this document resembles the EAB method in that it attempts to proactively notify MTC devices of an overload state in order to make them refrain from access attempts. A difference from the earlier-described EAB method is that the method and apparatus of this disclosure use a MAC (Medium Access Control) subheader instead of the system information to carry the overload indications to the MTC devices. A concerned MTC device is required to check for possible overload indications before it attempts to access the network through the random access procedure. Hence, a MTC device which wants to access the network must first monitor the downlink until it receives a message including the MAC subheader triggered by a random access attempt from another UE, i.e. a UE different from the concerned UE. If the MAC subheader does not contain any overload indication, the MTC device is allowed to initiate the random access procedure by transmitting a random access preamble to the base station. On the other hand, if the MAC subheader does include an overload indication, the MTC device waits a certain time until it sends the random access preamble. If applying a procedure as disclosed in this disclosure, the base station may potentially send out a large amount of messages irrespective of the overload situation. Thus, unnecessarily much system resources may be consumed. Also, since MTC devices are supposed to check the overload situation before attempting to send their respective random access preambles, the overall procedure may become delayed in some situations. Potentially, the monitoring and reception of the MAC subheaders may also mean an increased energy consumption of the UE.

SUMMARY

It is in view of the above considerations and others that the various embodiments of the present invention have been made.

There is still a need to provide overload control in communication systems, particularly (though not exclusively) for MTC communication. In view of this, it is therefore a general object of the various embodiments of the present invention to provide for an improved overload, or congestion, control in communication systems.

The various embodiments of the present invention as set forth in the appended independent claims address this general object. The appended dependent claims represent additional advantageous embodiments of the present invention.

According to an aspect, there is provided a method performed by a radio network node for overload control in a communication network. The method comprises determining a condition indicative of overload; in response thereto, including an overload indicator in a Medium Access Control (MAC) Protocol Data Unit (PDU), the overload indicator representing an indication that transmission resources for a user equipment (UE) will be allocated at a later point in time; and transmitting the MAC PDU including the overload indicator to the UE for indicating to the UE that transmission resources will be allocated to the UE at a later point in time.

The MAC PDU may comprise a MAC header and at least one MAC Random Access Response (RAR) field. Furthermore, the including of the overload indicator in the MAC PDU may comprise including the overload indicator in one or more fields of the at least one MAC RAR field. Still further, the including of the overload indicator in one or more fields of the at least one MAC RAR field may comprise including the overload indicator in an uplink grant, UL, grant field, of the MAC RAR field.

In one embodiment, said overload indicator may comprise a field specifying when transmission resources will be available for allocation to the UE. Said field specifying when transmission resources will be available for allocation to the UE may comprise a specified time period during which transmission resources will be available for allocation to the UE.

In one embodiment, the MAC PDU may comprise a MAC header and at least one MAC Random Access Response (RAR) field and the including of the overload indicator in the MAC PDU may comprise altering the setting of a Reserved field of the MAC RAR field.

The method may further comprise, prior to determining the condition indicative of the overload, receiving a random access preamble from the UE on a Physical Random Access Channel (PRACH).

Also, the MAC PDU including the overload indicator may, in some embodiments, be transmitted to the UE, for example, on a Physical Downlink Shared Channel, indicated by a downlink resource assignment addressed to a random access RNTI (RA-RNTI) on a Physical Downlink Control Channel (PDCCH).

According to another aspect, there is provided a method performed by a user equipment (UE). The method comprises transmitting, to a radio network node, a random access preamble, e.g., on a Physical Random Access Channel (PRACH); and receiving a MAC PDU, the MAC PDU comprising an overload indicator indicating that transmission resources will be allocated to the UE at a later point in time.

The MAC PDU may comprise a MAC header and at least one MAC Random Access Response (RAR) field and the at least one MAC RAR field may include said overload indicator. Furthermore, said overload indicator may comprise a field specifying when transmission resources will be available for allocation to the UE. Still further, said field specifying when transmission resources will be available for allocation to the UE may comprise a specified time period during which transmission resources will be available for allocation to the UE.

The method may additionally comprise monitoring, during the specified time period only, a Physical Downlink Control Channel (PDCCH) for reception of an UL grant for allocating transmission resources to the UE. Also, the method may comprise determining to discontinue monitoring the PDCCH when the UE has not received any UL grant allocating transmission resources to the UE during the specified time period.

According to still another aspect, there is provided a radio network node. The radio network node, which may for example be an evolved NodeB, comprises a transmitter, a processor; and a memory storing computer program code which, when run in the processor causes the radio network node to: determine a condition indicative of overload; in response thereto, including an overload indicator in a Medium Access Control (MAC) Protocol Data Unit (PDU) to the overload indicator representing an indication that transmission resources for a user equipment, UE, will be allocated at a later point in time; and transmit, by means of the transmitter, said MAC PDU including the overload indicator to the UE for indicating to the UE that transmission resources will be allocated to the UE at a later point in time.

The MAC PDU may comprise a MAC header and at least one MAC Random Access Response (RAR) field. Also, the memory and the computer program code may be configured to, with the processor, cause the radio network node to include the overload indicator in one or more fields of the MAC RAR field.

Furthermore, the memory and the computer program code may be configured to, with the processor, cause the radio network node to include the overload indicator in an uplink grant, UL, grant field, of the MAC RAR field. For example, said overload indicator may comprise a field specifying when transmission resources will be available for allocation to the UE. Also, the overload indicator may comprise a specified time period during which transmission resources will be available for allocation to the UE.

Still further, the memory and the computer program code may be configured to, with the processor, cause the radio network node to alter the setting of a Reserved field of the MAC RAR.

Moreover, the radio network node may comprise a receiver configured to receive, prior to determining the condition indicative of an overload, a random access preamble from the UE, e.g., on a Physical Random Access Channel (PRACH).

Yet further, the transmitter may be configured to transmit the MAC PDU including the overload indicator to the UE on a Physical Downlink Shared Channel, indicated by a downlink resource assignment addressed to a random access RNTI (RA-RNTI) on a Physical Downlink Control Channel (PDCCH).

According to yet another aspect, there is provided a user equipment, UE. The UE comprises: a transmitter configured to transmit, to a radio network node, a random access preamble, e.g., on a Physical Random Access Channel, (PRACH); and a receiver configured to receive a MAC PDU, the MAC PDU comprising an overload indicator indicating that transmission resources will be allocated to the UE at a later point in time.

The MAC PDU may comprise a MAC header and at least one MAC Random Access Response (RAR) field. Also, the MAC RAR field may include said overload indicator. Furthermore, said overload indicator may comprise a field specifying when transmission resources will be available for allocation to the UE. Also, said field specifying when transmission resources will be available for allocation to the UE may comprise a specified time period during which transmission resources will be available for allocation to the UE.

The UE may additionally comprise a processor; and a memory storing computer program code which, when run in the processor causes the UE to, during the specified time period only, monitor a Physical Downlink Control Channel (PDCCH) for reception, via the receiver, of an UL grant for allocating transmission resources to the UE. For example, the memory and the computer program code may be configured to, with the processor, cause the UE to determine to discontinue monitoring the PDCCH when the UE has not been received any UL grant allocating transmission resources during the specified time period.

BRIEF DESCRIPTION OF THE DRAWINGS

These and other aspects, features and advantages of the invention will be apparent and elucidated from the following description of embodiments of the present invention, reference being made to the accompanying drawings, in which.

DETAILED DESCRIPTION

The invention will now be described more fully hereinafter with reference to the accompanying drawings, in which certain embodiments of the invention are shown. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements or method steps throughout the description.

Figure 1A:
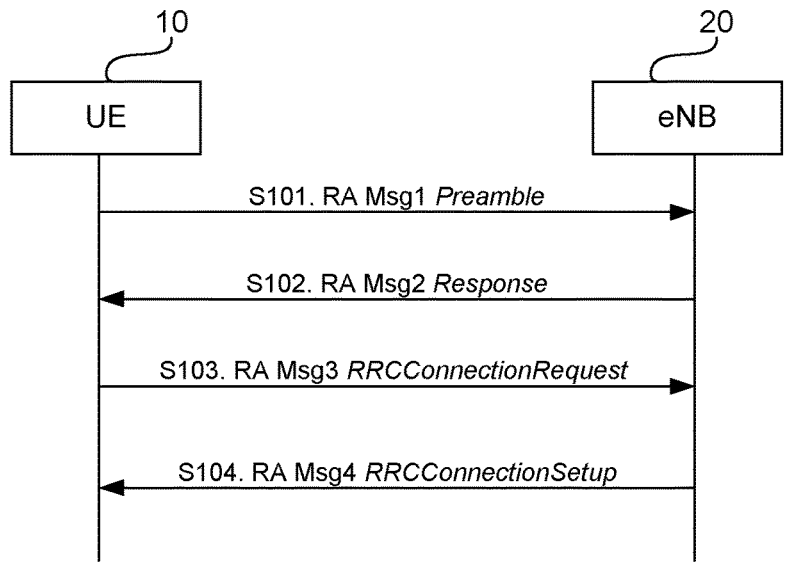
FIG. 1a illustrates an example random access procedure.

FIG. 1a illustrates an example random access procedure of a UE in a 3GPP LTE communication system. As a process for a user equipment, UE, to be attached to a communication network, a random access procedure is performed in the cases of initial attachment, handover, scheduling request, uplink time synchronization, to establish a Radio Resource Control (RRC) connection (i.e. transition from the RRC-IDLE to the RRC-CONNECTED state), and so forth. In other words, UEs perform random access for initial attachment and data transmission.

As used in the following the term "UE" is any device, which can be used by a user to communicate. Also, the term UE may be referred to as a mobile terminal, a terminal, a user terminal (UT), a wireless terminal, a wireless communication device, a wireless transmit/receive unit (WTRU), a mobile phone, a cell phone, etc. Yet further, the term UE includes MTC devices, which do not necessarily involve human interaction.

The term "radio network node" as used herein generally denotes a fixed point being capable of communicating with the UE. As such, it may be referred to as a base station, a radio base station, a NodeB or an evolved NodeB (eNB), access point, etcetera.

Referring to the random access procedure illustrated in FIG. 1a, an example random access procedure involving a transition from RRC-IDLE to RRC-CONNECTED state is shown. A UE 10 selects a random access preamble and transmits S101 the selected random access preamble RA Msg1 to the radio network node 20 e.g. on the Physical Random Access Channel (PRACH). Subsequently, the radio network node 20 transmits S102 a random access response (RAR) RA Msg2 to the UE 10.

Figure 2:
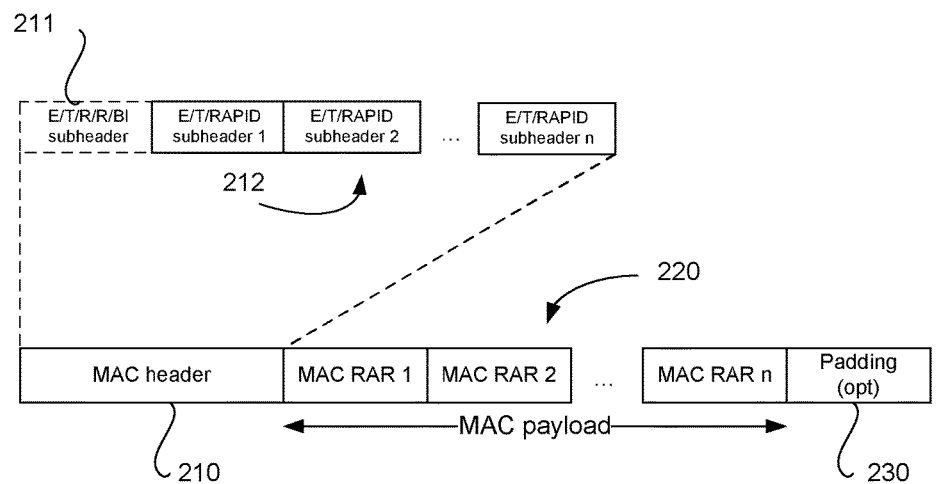
FIG. 2 shows an example constitution, or format, of a MAC PDU.

With reference to FIG. 2, an example of a RAR message (i.e. RA Msg2 transmitted S102 from the radio network node 20 to the UE 10) is shown. A medium access control (MAC) protocol data unit (PDU) format as defined in *Technical Specification* 3GPP TS 36.321 V.11.0.0 (2012 September) and as exemplified in FIG. 2 comprises a MAC header 210 and zero, one or more MAC RARs 220. The MAC RARs 220 are so-called payload fields. Optionally, a padding field 230 can be included. The MAC header 210 has a variable length and includes at least one MAC subheader 211, 212.

Each subheader 212 except a Backoff indicator (BI) subheader 211 corresponds to one MAC RAR. If included, the BI subheader 211 may be the first subheader included within the MAC header 210. The BI subheader 211 may comprise five header fields, i.e. an E field of one bit, a T field of one bit, a BI field of four bits, and reserved (R) fields of two bits. In general, such a structure is referred to as an E/T/R/R/BI structure. Here, the E field is an extension field indicating whether or not an additional field is in the MAC header 210. For example, where the E field is set to 1, there are follow-up E/T/RAPID (Random Access Preamble IDentifier) fields 212. Where the E field is set to 0, MAC RARs 220 or padding 230 is started from the next byte. The T field is a type flag indicating whether or not the MAC subheader 211 has an access ID (i.e. is a RAPID subheader corresponding to a MAC RAR) or BI. In a general message, 0 is used as an R bit. In other words, a general UE 10 performs a procedure irrespective of the R fields included in the RAR message. Furthermore, the MAC subheaders denoted 212 may comprise three header fields, i.e. an E field of one bit, a T field of one bit and a RAPID field of six bits. Here, the RAPID field indicates identification (ID) of a transmitted RAR. In general, such a structure is referred to as an E/T/RAPID structure.

Figure 3:
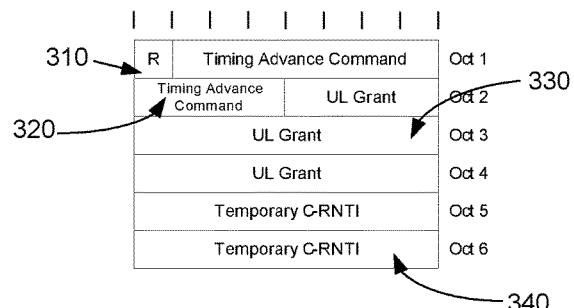
FIG. 3 shows an example constitution, or format, of a MAC RAR message field.

A MAC RAR 220 generally comprises four fields, as defined in *Technical Specification* 3*GPP TS* 36.321 *V.*11.0.0 (2012 September) and as exemplified in FIG. 3. Each MAC RAR may comprise six octets, each octet comprising eight bits as is also illustrated in FIG. 3. A first field 310 may be a reserved (R) field of one bit. A second field 320 may be a Timing Advance Command field of, e.g., eleven bits. A third field 330 may comprise an uplink (UL) grant field. The third field 330 may be of e.g. 20 bits. Finally, a fourth field 340 may comprise the Temporary C-RNTI (Cell Radio Network Temporary Identifier). The fourth field 340 may be of 16 bits.

Referring again to FIG. 1, when the UE 10 successfully receives a response message, RA Msg 2, from the radio network node 20 (i.e. in response to the random access preamble sent in RA Msg 1), the UE 10 transmits S103 RA Msg3 including a UE identifier (ID) to the radio network node 20. When doing so, the UE 10 may use radio resources which have been allocated to the UE 10 by the radio network node 20, as is well-known among persons skilled in the art. The RA Msg 3 is sometimes referred to as a RRCConnectionRequest message. Subsequently, the radio network node 20 receiving the RA Msg 3 transmits S104 a RA Msg 4 to complete, or conclude, the contention resolution. This RA Msg4 is sometimes referred to as an RRCConnectionSetup message. Consequently, the UE 10 receives S104 the contention resolution message RA Msg 4. The random access procedure is completed when the UE 10 receives S104 the contention resolution message RA Msg 4.

Figure 1B:
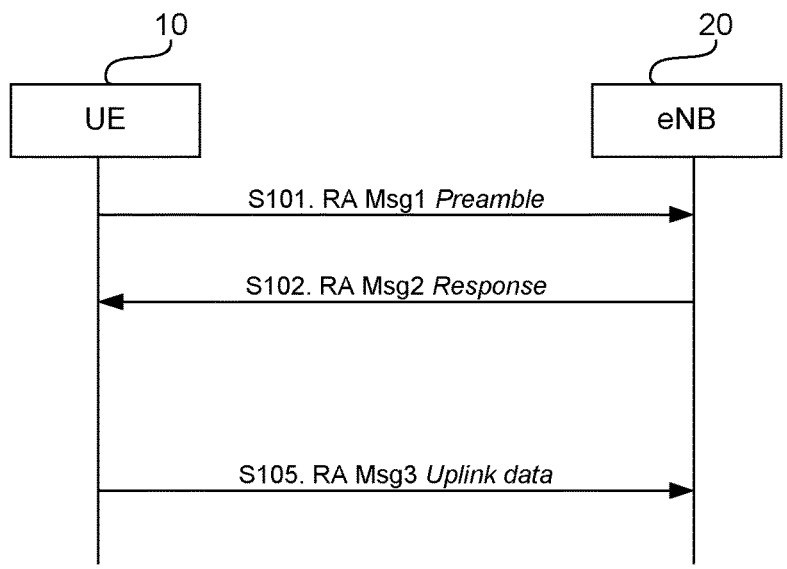
FIG. 1b illustrates an example random access procedure.

Random access procedures are also used in other scenarios, i.e. scenarios that are different from the above-described scenario with respect to FIG. 1*a*. For example, another scenario is when the UE is already in the RRC-Connected state, but lack uplink synchronization (e.g. lacks a valid timing advance). An example of such procedure is illustrated in FIG. 1*b*. As can be seen, this method is comparatively shorter than the method illustrated in FIG. 1*a*. Steps S101 and S102 are the same or substantially the same as steps S101 and S102 of FIG. 1*a* and will therefore not be further detailed here. Compared with the example procedure in FIG. 1*a*, the RA Msg4 can be omitted in the procedure of FIG. 1*b*. Also, compared to the procedure of FIG. 1*a*, the RA Msg3 is different. In the procedure of FIG. 1*b*, the UE 10 can transmit (to the radio network node 20) a RA Msg3 which includes a C-RNTI (Cell Radio Network Temporary Identifier). The RA Msg 3 may e.g. be transmitted on a Physical Uplink Shared Channel (PUSCH). Optionally, the RA Msg3 may additionally include a buffer status report (BSR) and/or user data. Whether or not a BSR and/or user data is included may, for example, be determined in dependence on whether there is space available in the allocated transmission resources. As a mere example, whether or not the RA Msg3 includes a BSR and/or user data may, be determined by the following rule: If all user data can be fit into a transport block, then inclusion of user data has priority over BSR, but if not all user data can be fit into the transport block, then the BSR has priority over the user data.

While FIG. 1*a* and FIG. 1*b* show two example random access procedures according to two different scenarios, other scenarios and thus random access procedures can also be conceivable. Therefore, the herein detailed embodiments of the invention should not be limited to the above two scenarios.

An example embodiment of the present invention will now be described with reference to FIGS. 4 and 5. FIGS. 4*a* and 4*b* illustrate signaling diagrams, or flow charts, of the example procedures. FIG. 5*a* shows a format of a MAC PDU including an overload indicator (OI) in accordance with this example embodiment. FIG. 5*b* shows an alternative format of a MAC PDU with an overload indicator (OI) included.

The UE 10 transmits S101 a random access preamble, e.g. on a PRACH channel, to a radio network node 20, here exemplified by an eNB. The radio network node 20 thus receives S101 the random access preamble from the UE 10.

The radio network node 20 determines S401 whether there exists a condition indicative of overload, or congestion. The radio network node 20 can determine whether there exists a condition indicative of overload in many different ways, in accordance with procedures known to persons skilled in the art. As a mere example and based on the assumption that there is an overload in the network, the radio network node 20 may e.g. be notified by a MME (Mobility Management Entity) of the overload state. In other words, the MME can determine whether there exists an overload condition in the communication network and if it does, the MME can notify the radio network node 20 about the overload condition. Accordingly, the radio network node 20 can determine that the overload condition, or overload state, exists.

Additionally, or alternatively, the radio network node 20 may be configured to determine whether there exists an overload condition with respect to its own resources. For example, the radio network node 20 may be configured to determine whether or not the radio network node 20 has sufficient resources to handle a random access procedure for the UE 10. To this end, the radio network node 20 is configured to monitor its resource situation, i.e. its available resources. The resources may, for example, include radio transmission resources and/or processing resources (e.g. processing capacity). In this example, if the radio network node 20 determines that it has insufficient resources to handle the random access procedure for the UE 10 it is determined to be in an overload condition. As a mere example, the radio network node 20 may be configured to determine whether or not there are sufficient radio transmission resources available for allocating transmission resources to the UE 10 such that the UE 10 can use these for subsequent transmission of RA Msg3 (see FIG. 1*b*). In some example implementations, a component such as a scheduler (sometimes referred to as scheduling unit or scheduling function) of the radio network node 20 may be configured to monitor the transmission resources the radio network node 20 has allocated. Also, the scheduler of the radio network node 20 may be configured to monitor pending downlink data in scheduling queues, outstanding (i.e. received but not yet responded to) scheduling requests, random access preambles and/or buffer status reports, etc. Consequently, the radio network node 20 may rather accurately predict the availability of current, thus available, transmission resources and other resources.

Figure 4A:
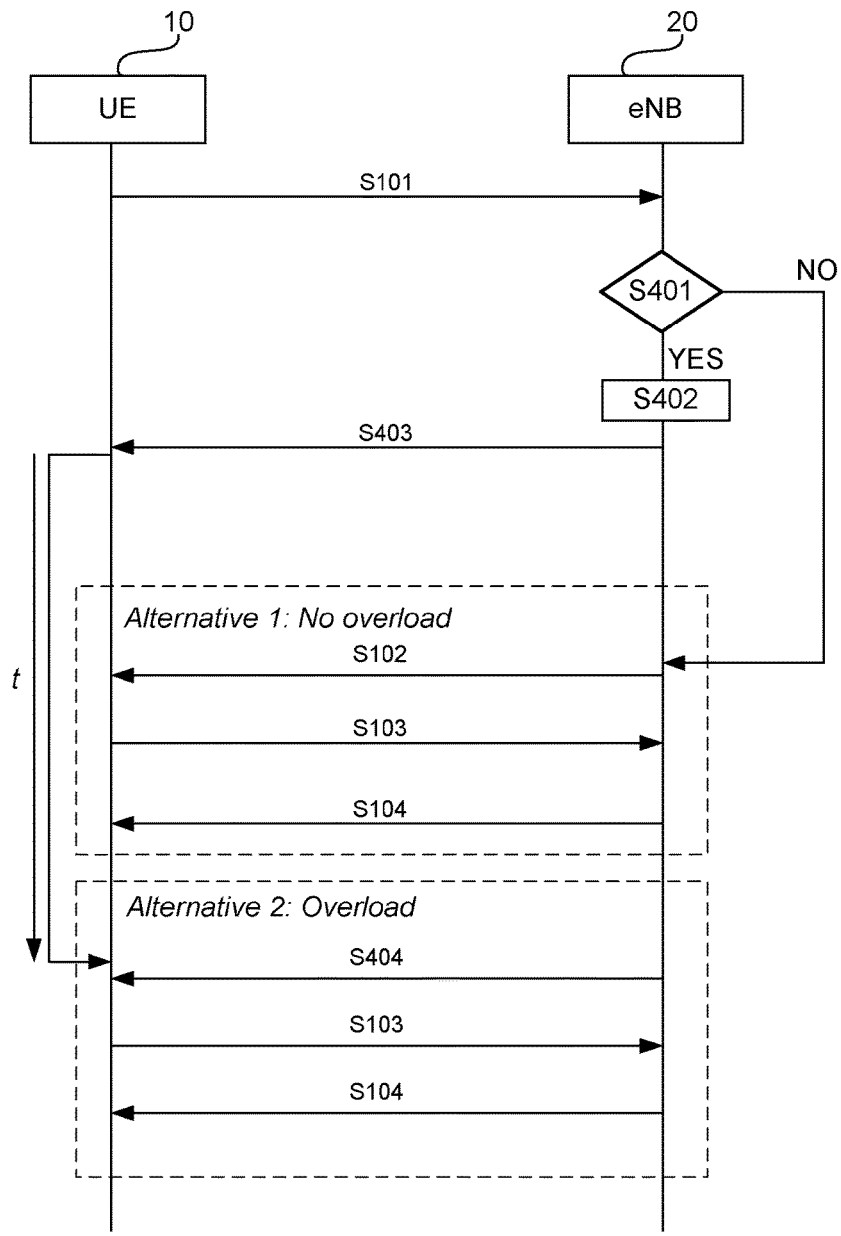
FIG. 4a shows a signaling diagram, or flow chart, of an example embodiment of the invention.
Figure 4B:
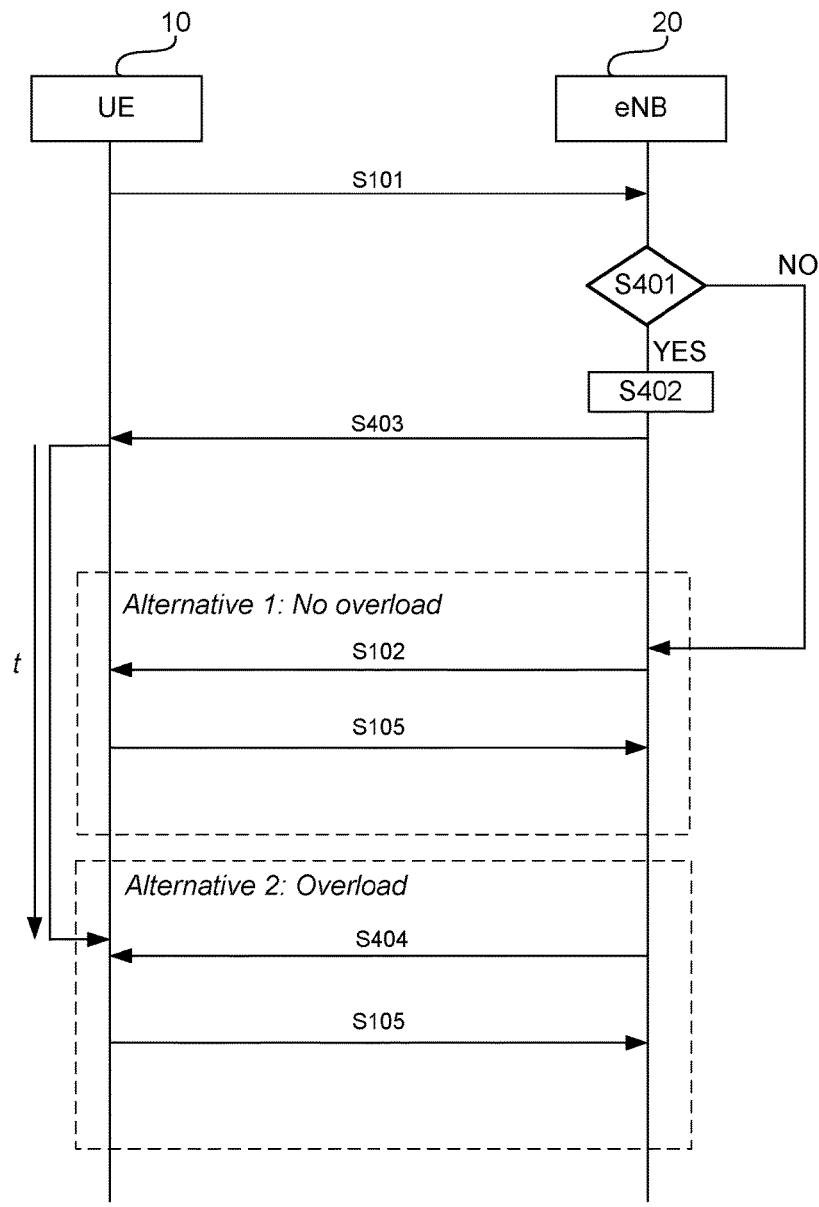
FIG. 4b shows a signaling diagram, or flow chart, of an example embodiment of the invention.
Figure 5A:
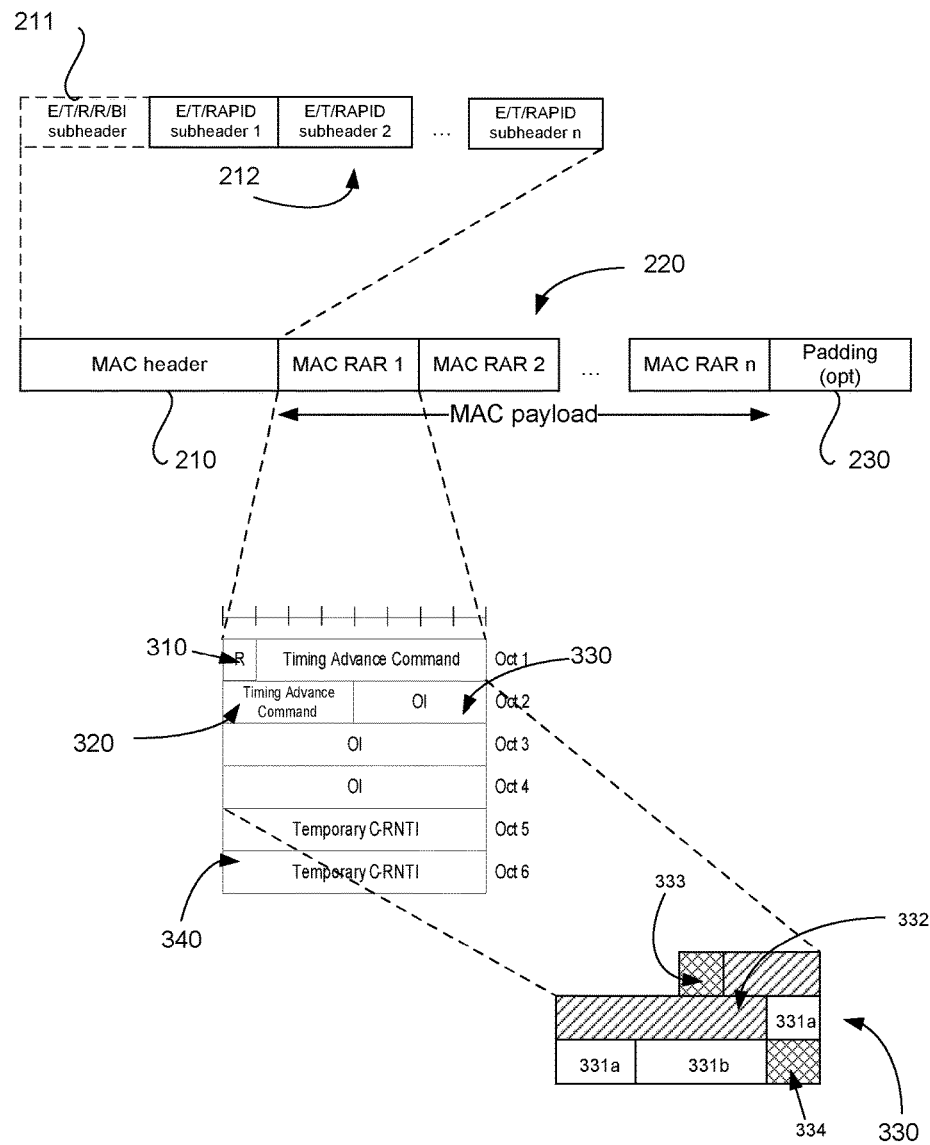
FIG. 5a shows a constitution of a MAC PDU according to an example embodiment of the invention.
Figure 5B:
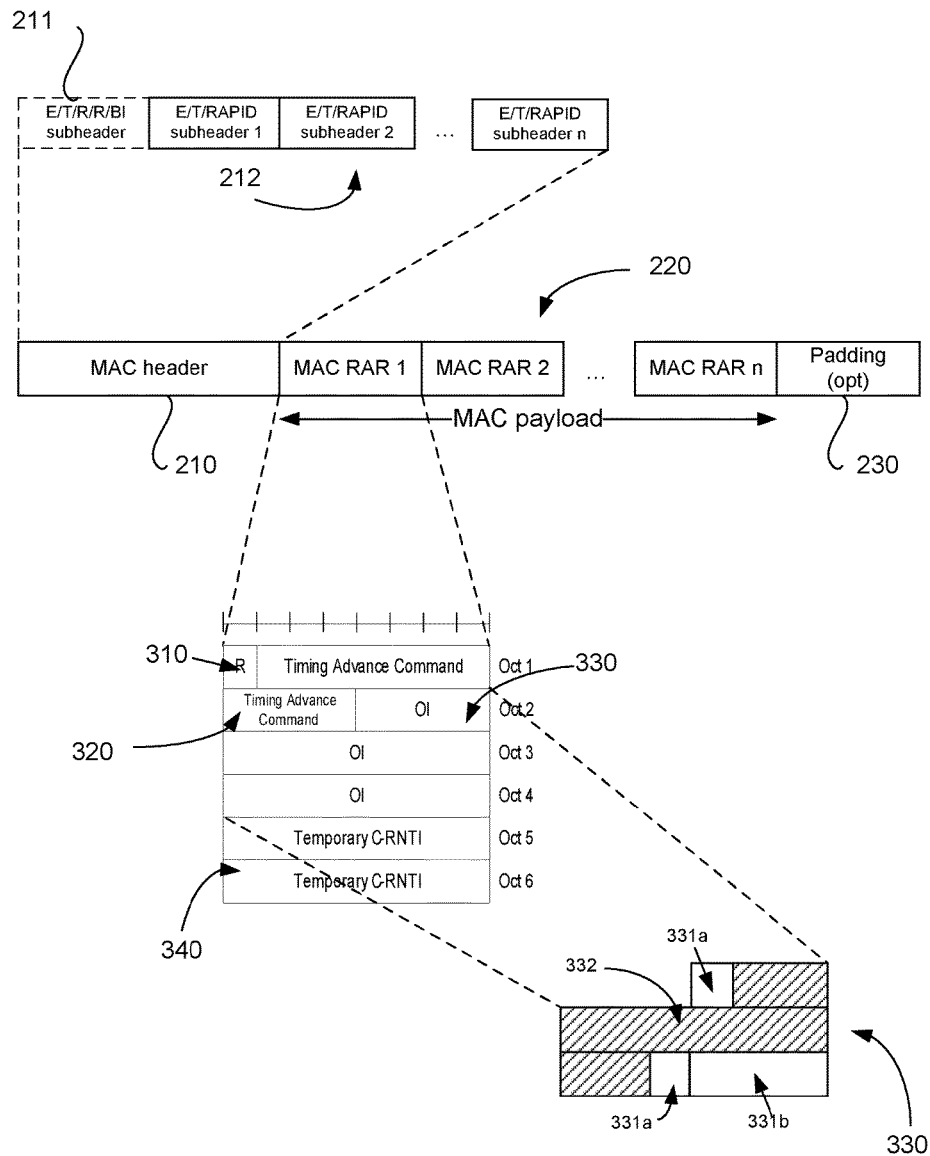
FIG. 5b shows a constitution of a MAC PDU according to an example embodiment of the invention.

If, or when, it is determined by the radio network node 20 that there is no overload condition, the method directly continues to step S102-S104 (see FIG. 4*a*). These steps are the same or substantially the same as the steps S102-S104 described earlier with respect to FIG. 1*a* and will therefore not be repeated here. Alternatively, the method directly continues to steps S102-S105 (see FIG. 4*b*). These steps are the same or substantially the same as the steps S102-S105 described earlier with respect to FIG. 1*b* and will therefore not be repeated here.

However, if or when a condition indicative of overload is determined by the radio network node 20, the radio network node 20 includes S402 an overload indicator in a MAC PDU. That is, in response to determining that there is an overload condition, the radio network node 20 includes S402 the overload indicator (OI) in the MAC PDU. In other words, the radio network node 20 configures the MAC PDU to include S402 the overload indicator (OI) in the MAC PDU. The overload indicator (OI) represents an indication that transmission resources for the UE 10 will be allocated at a later point in time (for example, when there is no longer an overload condition). If the overload condition is determined by the MME, the MME can notify the radio network node 20 when there is no longer any overload condition. Alternatively, or additionally, if it is determined whether there exists an overload condition with respect to the resources of the radio network node 20 itself, the radio network node 20 has an overview of its own resource situation (e.g. transmission and/or processing resources) and can, hence, determine when there are sufficient resources available. That is, when the radio network node 20 determines that previously insufficient resources becomes available it can conclude, thus determine, that there is no longer an overload condition.

With reference to FIG. 5*a*, a MAC PDU is exemplified to include a MAC header 210 and zero, one or several MAC RARs 220. In this example embodiment, if or when a condition indicative of an overload is determined, the radio network node 20 includes S402 the overload indicator (OI) in at least one of the MAC RARs, here exemplified by the first MAC RAR (i.e. MAC RAR1). In this example, one of the fields is used for the inclusion of the OI, namely the third field 330. Thus, the overload indicator (OI) is included in the position of the third field 330. As described earlier, the third field 330 may normally comprise an uplink (UL) grant field. However and according to this example embodiment, when it has been determined that there exists a condition indicative of overload, the radio network node 20 includes the overload indicator in the position of this third field 330. Consequently, the radio network node 20 configures the MAC RAR to disable the UL grant field 330 and, also, modify the third field 330 to include the overload indicator (instead of the UL grant). This format, that is, a MAC RAR 220 including an overload indicator (OI) is an important characteristic of some of the embodiments disclosed herein. The included overload indicator (OI) represents an indication that transmission resources for the UE 10 will be allocated at a later point in time In one detailed example embodiment, an OI field 330 is composed of 20 bits. The overload indicator OI may comprise one or several subfields. In the illustrated embodiment, there is a subfield 331 specifying when transmission resources will be available for allocation to the UE. For example, subfield 331 may comprise a specified time period during which transmission resources will be available for allocation to the UE. The specified time period may, e.g., be specified as a time period having a certain starting point. In one example embodiment, a first subfield 331*a* indicates the starting point of the specified time period and a second subfield 331*b* indicates the length of the specified time period. In other words, the second subfield 331*b* indicates a time window length in which transmission resources will be available for allocation to the UE. Furthermore, the OI field 330 of this example embodiment comprises a subfield 332 which is used to disable, or deactivate, the UL grant field 330. It may not be necessary to make use of all 20 bits of the third field 330. For example, in this example embodiment there are two fields which are not utilized, namely fields 333 and 334, which may e.g. be of 1 bit each.

However, it may be advantageous to keep the length of the third field 330 (20 bits) unchanged because this may facilitate backwards compatibility of UEs. FIG. 5*b* therefore illustrates an alternative constitution of the OI field 330, where all 20 bits are utilized. The same subfields 331 and 332 as shown with respect to FIG. 5*a* are included in the OI field 330 of FIG. 5*b* too. Therefore, these subfields will not be further described here. Another difference of the OI field 330 of FIG. 5*b* compared to that of FIG. 5*a* is the locations, or positions, of the subfields 331*a*, 331*b* and 332 relative to each other.

The exact number of bits to be utilized and the exact locations of the subfields 331*a*, 331*b*, 332 and the subfields 333 and 334 can be tested and evaluated in each specific case in dependence of needs or desires. Thus, it should be appreciated that various formats, or constitutions, of the OI field 330 are conceivable to those skilled in the art.

In yet alternative embodiments, it may not be necessary to specify any explicit length of the time period. In other words, the earlier-mentioned subfield 331*a* is not necessarily included in the OI field 330. Instead, it may be conceivable to use a fixed, thus pre-defined, length of the time period. This fixed length of the time period may be known to the UE 10 in advance. For example, the fixed time length could be standardized, e.g. by hard coding into UEs 10*s*. Alternatively, it could be provided to the UE through USIM (Universal Subscriber Identity Module) configuration. Yet further, it could be possible to provide this information via system information transmissions.

As described above, the radio network node 20 includes S402 the overload indicator (OI) into the MAC PDU, e.g. into at least one of the MAC RARs. The MAC PDU thus comprising the overload indicator is transmitted S403 to the UE 10 when it has been determined that there exists a condition which is indicative of overload. The MAC PDU including the overload indicator (OI) may be transmitted S403 to the UE. In one embodiment, the MAC PDU including the OI is transmitted S403, for example, on a Physical Downlink Shared Channel (PDSCH), indicated by a downlink resource assignment addressed to a random access RNTI (RA-RNTI) on a Physical Downlink Control Channel (PDCCH).

The UE 10 may consequently receive S403 the MAC PDU comprising the overload indicator (OI), which indicates to the UE 10 that transmission resources will be allocated to the UE at a later point in time. In this example embodiment, the MAC PDU comprises a MAC header 210 and at least one MAC RAR field 220 wherein the at least one MAC RAR field (here exemplified by MAC RAR1) includes said overload indicator (OI) 330, as described hereinabove. Accordingly, the UE will be notified that there exists a condition which is indicative of overload. More importantly, the UE will be notified that transmission resources will be allocated at a later point in time.

If, or when, the UE 10 receives S403 the MAC PDU including the overload indicator the UE 10 begins monitoring a PDCCH for reception of an UL grant for allocating transmission resources to the UE. In one embodiment, the UE 10 only monitors the PDCCH during the specified time period t, e.g. the time period specified by the overload indicator (OI) included in the received MAC PDU. If, or when, the UE receives an UL grant (S404) the method may proceed with steps S103-S104. These steps are the same or substantially the same as the steps S103-S104 described earlier with respect to FIG. 1*a* and will therefore not be repeated here. Alternatively, when the UE receives an UL grant (S404) the method may proceed to step S105. This step is the same or substantially the same as the steps S105 described earlier with respect to FIG. 1*b* and will therefore not be repeated here.

When the UE 10 has not received any UL grant allocating transmission resources to the UE during the specified time period t, the UE can discontinue monitoring the PDCCH. This may be advantageous in order to save internal resources of the UE 10.

Also, if the radio network node 20 would not find available resources for the UE 10 within the specified time period, the radio network node 20 will generally not be able to transmit any UL grant allocating transmission resources to the UE. Thus, it is advantageous if the UE 10 can discontinue monitoring the PDCCH after the specified time period. This can be seen as the UE 10 concluding that its access attempt failed. Consequently, the UE 10 may restart the random access procedure after a certain delay time, e.g. after a so-called backoff delay time (which may be indicated by the BI 211 of the MAC PDU).

The example embodiment described hereinabove with respect to FIGS. 4 and 5 provides a procedure for control of overload in a communication network. More particularly, it may allow for an improved control of network access load. This makes this embodiment particularly appealing with the introduction of MTC communication in 3GPP-based communication networks where it is envisaged that many UEs and other devices will want to access radio resources simultaneously, or substantially simultaneously.

Figure 6:
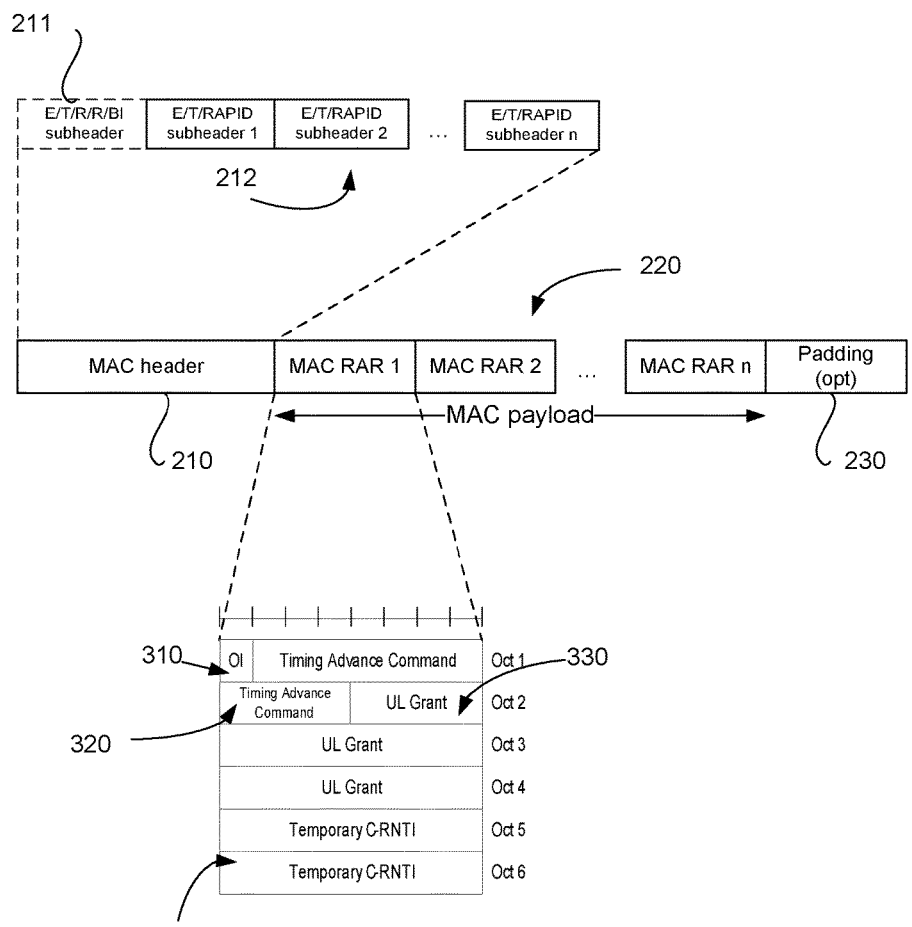
FIG. 6 shows a constitution of a MAC PDU according to another example embodiment of the invention.

Instead of utilizing a constitution of an OI field 330 as described with respect to FIG. 5, another field of the MAC PDU can be exploited, as will now be described with respect to FIG. 6. In this example embodiment, a first field 310 is exploited, or utilized. As described earlier, the first field 310 may generally comprise a Reserved field (R) of one bit. In the example embodiment of FIG. 6, this R bit is used as the overload indicator (OI). For instance, altering the setting (e.g. by setting the field 310 to 1, instead of 0) of the first field 310 it is possible to indicate to the UE 10 that that transmission resources for the UE will be allocated at a later point in time similar to the embodiments described with respect to FIG. 5. This embodiment may be advantageous as it is simpler and adds very little complexity (only altering a setting of the first field 310). Another advantage of this embodiment is that it makes use of an otherwise unused field 310.

Figure 7:
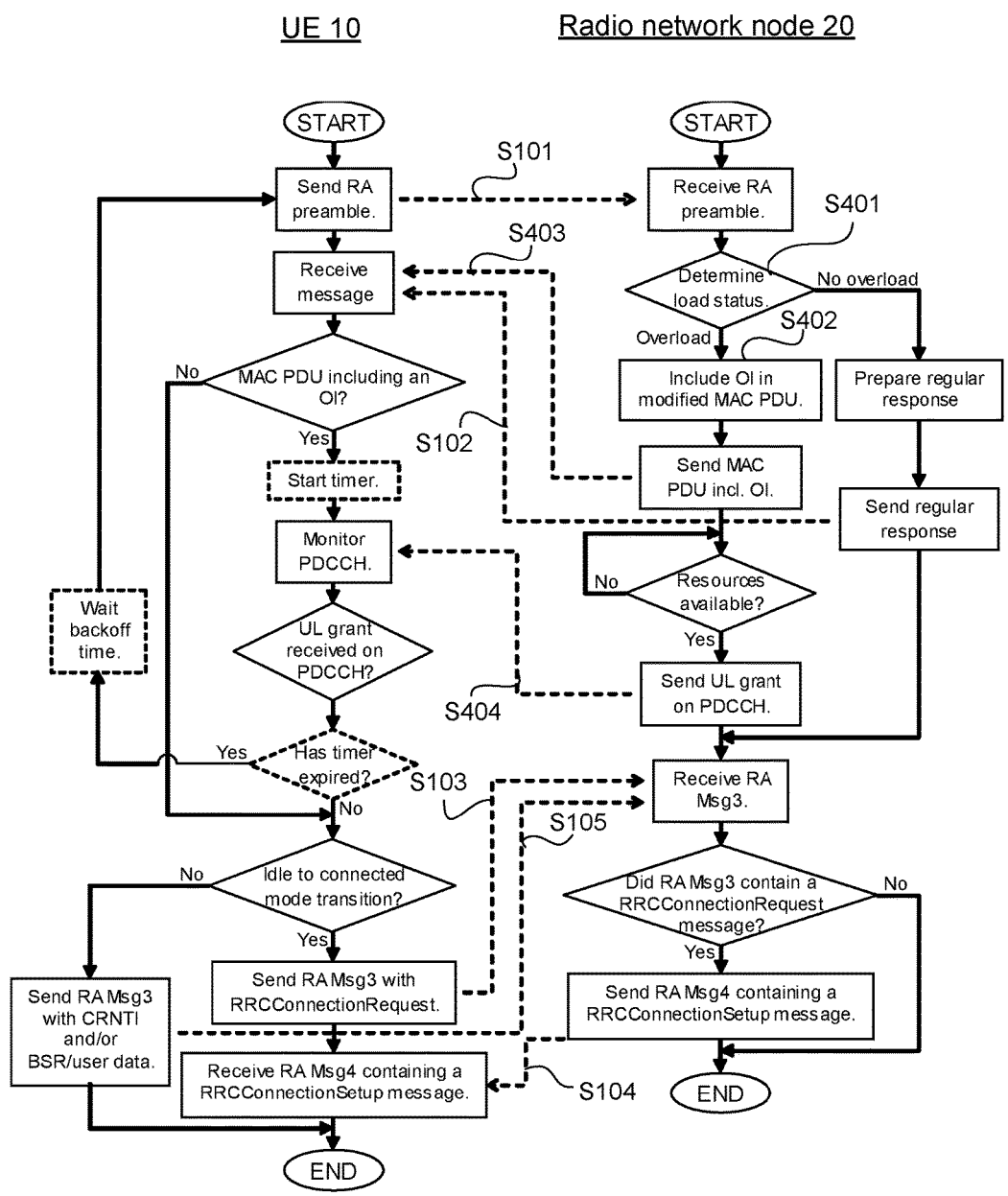
FIG. 7 shows flow charts illustrating an example embodiment of the invention.

Turning now to FIG. 7, two flow charts are shown to illustrate an example embodiment of the invention. One of the flow charts show a method which can be performed by the UE 10. The other flow chart shows a method which can be performed by the radio network node 20.

The UE 10 transmits S101 a random access preamble, e.g. on a PRACH channel, to a radio network node 20. The radio network node 20, which may e.g. be an eNB, thus receives S101 the random access preamble from the UE 10. The radio network node 20 determines S401 whether there exists a condition indicative of overload, or congestion. The radio network node 20 can determine whether there exists a condition indicative of overload in many different ways and as described earlier in this disclosure.

If, or when, it is determined by the radio network node 20 that there is no overload condition, the radio network node 20 can prepare a regular response message, i.e. a RA Msg2 message. The RA Msg2 message has been described earlier and will therefore not be further detailed here. Also, the radio network node 20 transmits this regular response message to the UE 10. However, if or when a condition indicative of overload is determined by the radio network node 20, the radio network node 20 includes S402 an overload indicator in a MAC PDU. Similar to above, the radio network node 20 can include the overload indicator as described with respect to FIGS. 4, 5 and/or 6. That is, the radio network node 20 may, for example, include S402 the overload indicator (OI) into the MAC PDU, e.g. into at least one of the MAC RARs. The MAC PDU thus comprising the overload indicator is then transmitted S403 to the UE 10 when it has been determined that there exists a condition which is indicative of overload.

The UE 10 receives S102/S403 a response message. The UE 10 may then determine whether or not the received response message comprises a MAC PDU including an overload indicator which indicates to the UE 10 that transmission resources will be allocated to the UE at a later point in time. In this example embodiment, the MAC PDU may comprise a MAC header 210 and at least one MAC RAR field 220 wherein the at least one MAC RAR field (here exemplified by MAC RAR1) includes said overload indicator (OI) 330, as described hereinabove.

If, or when, the UE 10 receives S403 a MAC PDU including the overload indicator the UE 10 begins monitoring a PDCCH for reception of an UL grant for allocating transmission resources to the UE. In one embodiment, the UE 10 only monitors the PDCCH during the specified time period t, e.g. the time period specified by the overload indicator (OI) included in the received MAC PDU as described hereinabove. In one example implementation, the UE 10 comprises a timer or timer function, which can be implemented either by hardware, software or both hardware and software. Hence, when the UE 10 determines that the response message comprises a MAC PDU with the overload indicator (OI), it may start the timer or timer function. When the UE 10 has not received any UL grant allocating transmission resources to the UE during the specified time period t, the UE can discontinue monitoring the PDCCH. For example, when the timer or timer function has expired after the specified time period t, it is possible to discontinue monitoring the PDCCH. This can be seen as the UE 10 concluding that its access attempt failed. Consequently, the UE 10 may restart the random access procedure after a certain delay time, e.g. after a so-called backoff delay time.

A radio network node 20 that has previously determined a condition indicative of overload may continue monitoring the load condition. For example, the radio network node 20 may continuously check the load condition or, alternatively, at certain intervals such as every 5, 10, 15, 30 or 60, 120, 180, 360 seconds. When the radio network node 20 determines that previously insufficient resources becomes available (i.e. the load state is no longer an overload condition), the radio network node 20 may transmit an UL grant for allocating transmission resources to the UE.

The UE 10, which is monitoring the PDCCH, may consequently receive the UL grant for allocating transmission resources to the UE in due course (i.e. the time t has expired).

If, or when, the UE receives the UL grant for allocating transmission resources to the UE during the specified time period t, the UE 10 may continue by determining whether a transition from a RRC-Idle state to a RRC-Connected state is to be made.

If, or when, the UE 10 determines that no transition from a RRC-Idle state to a RRC-Connected state is to be made, the UE 10 transmits S105 a RA Msg3. Since step S105 has been described earlier this will not be repeated here. However, If, or when, the UE 10 determines that a transition from an RRC-Idle state to an RRC-Connected state is to be made, the UE 10 transmits S103 a RA Msg3 including a RRCConnectionRequest to the radio network node 20. Since step S103 has been described earlier this will not be repeated here.

The radio network node 20 thus receives S103/S105 a RA Msg3 message. In response to receiving the RA Msg3 message, the radio network node 20 may be configured to determine whether this message includes an RRCConnectionRequest. If it does include the RRCConnectionRequest, the radio network node 20 transmits S104 a RA Msg4 message to the UE10. Since step S104 has been described earlier this will not be repeated here.

Figure 8:
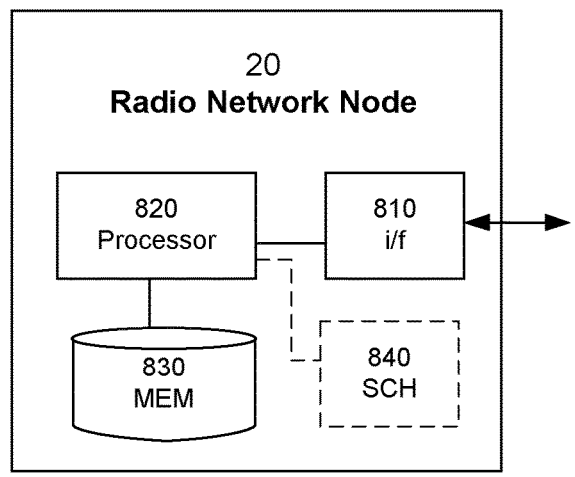
FIG. 8 shows an example embodiment of a UE.
Figure 9:
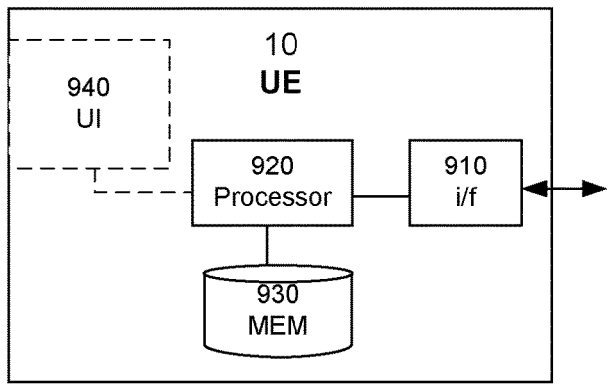
FIG. 9 shows an example embodiment of a radio network node such as an eNB.

Turning now to FIG. 8, a radio network node 20 according to an example embodiment will be described. The radio network node 20, which may for example be an evolved NodeB, comprises a transmitter 810, a processor 820, and a memory 830. The memory 830 stores computer program code which, when run in the processor 820 causes the radio network node 20 to determine a condition indicative of an overload; in response thereto include an overload indicator (OI) in a MAC PDU, the overload indicator representing an indication that transmission resources for a user equipment, UE, will be allocated at a later point in time; and to transmit, by means of the transmitter 810, said MAC PDU including the overload indicator to the UE for indicating to the UE that transmission resources will be allocated to the UE at a later point in time.

In some embodiments, the radio network node 20 may be configured to determine whether or not the radio network node 20 has sufficient resources to handle a random access procedure for the UE 10. To this end, the radio network node 20 may be configured to monitor its resource situation, i.e. its available resources. These resources may relate to transmission resources, processing resources or both. In one embodiment, the memory 830 and the computer program code may be configured to, with the processor 820, cause the radio network node 20 to monitor its resource situation, i.e. its available resources. In another example implementation, the radio network node may alternatively comprise a scheduler 840, which is in charge of the monitoring of the available resources.

In some embodiments, the memory 830 and the computer program code are configured to, with the processor 820, cause the radio network node 20 to include the overload indicator (OI) in one or more fields of a MAC RAR field. For example, the memory 830 and the computer program code may be configured to, with the processor 820, cause the radio network node 20 to include the overload indicator in an uplink grant, UL, grant field, of the MAC RAR field. The overload indicator may comprise a field specifying when transmission resources will be available for allocation to the UE. In one embodiment, the overload indicator (OI) comprises a specified time period during which transmission resources will be available for allocation to the UE. In an alternative embodiment, the memory 830 and the computer program code are configured to, with the processor 820, cause the radio network node 20 to alter the setting of a Reserved field of the MAC RAR.

The radio network node 20 may also comprise a receiver 810 configured to receive, prior to determining the condition indicative of an overload, a random access preamble from the UE on, e.g, a PRACH channel.

Also, the transmitter 810 may be configured to transmit the MAC PDU including the overload indicator to the UE, e.g. on a PDSCH, indicated by a downlink resource assignment addressed to a RA-RNTI on a PDCCH.

FIG. 8 illustrates a user equipment, UE 10, according to an example embodiment. The UE 10 comprises a transmitter 910 configured to transmit, to a radio network node, a random access preamble, e.g. PRACH channel; and a receiver 910 configured to receive a MAC PDU, the MAC PDU comprising an overload indicator indicating that transmission resources will be allocated to the UE at a later point in time. The MAC PDU comprises a MAC header and at least one MAC RAR field, wherein the at least one MAC RAR field includes said overload indicator (OI). The overload indicator (OI) indicates to the UE that transmission resources for the UE will be allocated at a later point in time. For example, the overload indicator (OI) may comprise a field specifying when transmission resources will be allocated to the UE. The field specifying when transmission resources will be allocated to the UE may in some embodiments comprise a specified time period during which transmission resources will be allocated to the UE.

The UE 10 may additionally comprise a processor 920 and a memory 930. The memory 930 may store computer program code which, when run in the processor 920 causes the UE 10 to, during a specified time period only, monitor a PDCCH channel, for reception, via the receiver 910, of an UL grant for allocating transmission resources to the UE 10. Also, the memory 930 and the computer program code may be configured to, with the processor 920, cause the UE 10 to determine to discontinue monitoring the PDCCH when the UE has not been received any UL grant allocating transmission resources to the UE 10 during the specified time period.

Yet further, the UE 10 may optionally comprise a user interface 940 through which a user can operate and interact with the UE 10.

It should be appreciated that, in some embodiments, it may be advantageous if the radio network node 20 prioritizes which UE(s) to which it transmits the MAC PDU including the overload indicator (OI). As will be appreciated by those skilled in the art, the prioritization of UE(s) to select may be performed in numerous ways. As a mere example, the prioritization may be made on the basis of estimated, or measured, radio channel quality. For example, those UE(s) with the best estimated channel quality may be prioritized over those UE(s) with comparatively worse channel quality.

As an example basis for the channel quality estimation the radio network node 20 could use the signal strength or SINR (Signal to Interference plus Noise Ratio) with which the random access preamble was received and/or the propagation delay between the UE 10 and the radio network node 20 (wherein a longer propagation delay implies a potentially poorer channel quality). The propagation delay from a UE 10 may, e.g. be calculated from the timing of the reception of the preamble from the UE 20 within the reception window for random access preambles. Another example prioritization may be to simply arbitrarily prioritize among the UEs. Other ways of performing the prioritization are of course also conceivable.

According to the various embodiments disclosed throughout this disclosure, the inventors propose to include an overload indicator in a MAC PDU message. Advantageously, the overload indicator can be included in a MAC RAR message field. Some embodiments disclosed herein provide for an improved overload control mechanism, which is capable of reacting quickly to changes in the network overload situation. In some embodiments, an overload condition is reflected in real time, or substantially real time. Some embodiments disclosed herein may allow for UEs and radio network nodes to utilize their respective resources more efficiently. According to some embodiments, the UE's network access is not delayed unnecessarily much, i.e. not more than necessary in order to avoid current overload conditions occurring in the network. Moreover, some embodiments described herein are advantageous because these may reduce, or minimize, the energy consumption of UEs (that would otherwise result from UEs re-attempting network access in overload situations). Some of the embodiments disclosed herein are particularly (though not exclusively) appealing with the introduction of MTC type communication in 3GPP-based communication networks. More specifically, the embodiments disclosed herein may be interesting in scenarios where many UEs and/or other devices try to access a communication network simultaneously, or substantially simultaneously. Yet further, some of the embodiments described throughout this disclosure are backwards compatible, which may also be advantageous because this add little complexity to already available solutions.

In the detailed description hereinabove, for purposes of explanation and not limitation, specific details are set forth such as particular architectures, interfaces, techniques, etc. in order to provide a thorough understanding of various embodiments of the present invention. In some instances, detailed descriptions of well-known devices, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that block diagrams herein can represent conceptual views of illustrative circuitry or other functional units embodying the principles of the embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Although the present invention has been described above with reference to specific embodiments, it is not intended to be limited to the specific form set forth herein. Rather, the invention is limited only by the accompanying claims and other embodiments than the specific above are equally possible within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The invention claimed is:

1. A method performed by a radio network node for overload control in a communication network, the method comprising:
   determining a condition indicative of overload;
   in response to the determining, including an overload indicator and a time field in a Medium Access Control, MAC, Protocol Data Unit, PDU, wherein the overload indicator represents an indication that transmission resources for a user equipment, UE, will be allocated at a later point in time and the time field indicates when the transmission resources will be available for allocation to the UE, wherein the time field is located in an uplink, UL, grant field of at least one MAC Random Access Response, RAR, field of the MAC PDU;
   transmitting the MAC PDU including the overload indicator and the time field to the UE for indicating to the UE that transmission resources will be allocated to the UE at a later point in time;
   monitoring the condition indicative of overload; and
   in response to determining that there is no longer a condition indicative of overload, transmitting an uplink grant, on a Physical Downlink Control Channel, PDCCH, for allocating transmission resources to the UE.

2. The method according to claim 1, wherein the MAC PDU comprises a MAC header and the at least one MAC RAR field and wherein the including of the overload indicator in the MAC PDU comprises:
including the overload indicator in one or more fields of the at least one MAC RAR field.

3. The method according to claim 2, wherein the including of the overload indicator in one or more fields of the at least one MAC RAR field comprises:
including the overload indicator in the UL grant field, of the at least one MAC RAR field, wherein UL grants associated with the MAC RAR field are disabled.

4. The method according to claim 1, wherein said overload indicator comprises the time field specifying when the transmission resources will be available for allocation to the UE.

5. The method according to claim 4, wherein said time field specifying when the transmission resources will be available for allocation to the UE comprises a specified time period during which the transmission resources will be available for allocation to the UE.

6. The method according to claim 1, wherein the MAC PDU comprises a MAC header and at least one MAC Random Access Response, RAR, field and wherein the including of the overload indicator in the MAC PDU comprises altering a setting of a reserved field of the at least one MAC RAR field.

7. The method according to claim 1, further comprising, prior to determining the condition indicative of the overload:
receiving a random access preamble from the UE on a Physical Random Access Channel, PRACH.

8. The method according to claim 1, wherein the MAC PDU including the overload indicator is transmitted to the UE on a Physical Downlink Shared Channel, PDSCH, indicated by a downlink resource assignment addressed to a Random Access Radio Network Temporary Identifier, RA-RNTI, on a Physical Downlink Control Channel, PDCCH.

9. A method performed by a user equipment, UE, the method comprising:
transmitting, to a radio network node, a random access preamble;
receiving a Medium Access Control, MAC, Protocol Data Unit, PDU, the MAC PDU comprising an overload indicator indicating that transmission resources will be allocated to the UE at a later point in time, and a time field, indicating when the transmission resources will be available for allocation to the UE, wherein the time field is located in an uplink, UL, grant field of at least one MAC Random Access Response, RAR, field of the MAC PDU; and
in response to receiving the MACPDU comprising the overload indicator and the time field, monitoring a Physical Downlink Control Channel, PDCCH, for reception of an Uplink grant for allocating transmission resources to the UE.

10. The method according to claim 9, wherein the MAC PDU comprises a MAC header and the at least one MAC RAR field and wherein the at least one MAC RAR field includes said overload indicator.

11. The method according to claim 9, wherein said overload indicator comprises the time field specifying when the transmission resources will be available for allocation to the UE.

12. The method according to claim 11, wherein said time field specifying when the transmission resources will be available for allocation to the UE comprises a specified time period during which the transmission resources will be available for allocation to the UE.

13. The method according to claim 12, further comprising:
monitoring, during the specified time period only, a Physical Downlink Control Channel, PDCCH, for reception of an UL grant for allocating the transmission resources to the UE.

14. The method according to claim 13, further comprising:
determining to discontinue monitoring the PDCCH when the UE has not received any UL grant allocating the transmission resources to the UE during the specified time period.

15. A radio network node, comprising:
a transmitter;
a processor coupled with the transmitter; and
a memory coupled with the processor, storing computer program code which, when run in the processor causes the radio network node to:
determine a condition indicative of overload;
in response to the determination of the condition, including an overload indicator and a time field in a Medium Access Control, MAC, Protocol Data Unit, PDU, wherein the overload indicator represents an indication that transmission resources for a user equipment, UE, will be allocated at a later point in time and the time field indicates when the transmission resources will be available for allocation to the UE, wherein the time field is located in an uplink, UL, grant field of at least one MAC Random Access Response, RAR, field of the MAC PDU;
transmit, with the transmitter, said MAC PDU including the overload indicator and the time field to the UE for indicating to the UE that transmission resources will be allocated to the UE at a later point in time;
monitor the condition indicative of overload; and
in response to determining that there is no longer a condition indicative of overload, transmit, by the transmitter, an uplink grant, on a Physical Downlink Control Channel, PDCCH, for allocating transmission resources to the UE.

16. The radio network node according to claim 15, wherein the MAC PDU comprises a MAC header and the at least one MAC RAR field and wherein the computer program code when run on the processor, further causes the radio network node to include the overload indicator in one or more fields of the at least one MAC RAR field.

17. The radio network node according to claim 16, wherein the computer program code when run on the processor, further causes the radio network node to include the overload indicator in the uplink UL grant field, of the at least one MAC RAR field, wherein UL grants associated with the MAC RAR field are disabled.

18. The radio network node according to claim 15, wherein said overload indicator comprises the time field specifying when the transmission resources will be available for allocation to the UE.

19. The radio network node according to claim 18, wherein the time field indicates a specified time period during which the transmission resources will be available for allocation to the UE.

20. The radio network node according to claim 16, the computer program code when run on the processor, further causes the radio network node to alter a setting of a reserved field of the at least one MAC RAR field.

21. The radio network node according to claim 15, further comprising a receiver configured to receive, prior to determining the condition indicative of an overload, a random access preamble from the UE on a Physical Random Access Channel, PRACH.

22. The radio network node according to claim 15, wherein the transmitter is configured to transmit the MAC PDU including the overload indicator to the UE on a Physical Downlink Shared Channel, PDSCH, indicated by a downlink resource assignment addressed to a Random Access Radio Network Temporary Identifier, RA-RNTI, on a Physical Downlink Control Channel, PDCCH.

23. The radio network node according to claim 15, wherein the radio network node is an evolved NodeB, eNB.

24. A user equipment, UE, comprising:
a transmitter configured to transmit, to a radio network node, a random access preamble;
a receiver, coupled with the transmitter, configured to receive a Medium Access Control, MAC, Protocol Data Unit, PDU, the MAC PDU comprising an overload indicator, indicating that transmission resources will be allocated to the UE at a later point in time, and a time field, indicating when the transmission resources will be available for allocation to the UE, wherein the time field is located in an uplink, UL, grant field of at least one MAC Random Access Response, RAR, field of the MAC PDU; and
a processor and a memory storing computer program code which, when run in the processor causes the UE, to:
in response to receiving the MAC PDU comprising the overload indicator and the time field, monitor a Physical Downlink Control Channel, PDCCH, for reception, via the receiver, of an uplink grant for allocating transmission resources to the UE.

25. The UE according to claim 24, wherein the MAC PDU comprises a MAC header and the at least one MAC RAR field and wherein the at least one MAC RAR field includes said overload indicator.

26. The UE according to claim 24, wherein said overload indicator comprises the time field specifying when the transmission resources will be available for allocation to the UE.

27. The UE according to claim 26, wherein said time field specifying when transmission resources will be available for allocation to the UE comprises a specified time period during which the transmission resources will be available for allocation to the UE.

28. The UE according to claim 27, further comprising:
a processor; and
a memory, coupled with the processor, storing computer program code which, when run in the processor causes the UE to, during the specified time period only, monitor a Physical Downlink Control Channel, PDCCH, for reception, via the receiver, of a UL grant for allocating the transmission resources to the UE.

29. The UE according to claim 28, wherein the computer program code when run in the processor, further causes the UE to determine to discontinue monitoring the PDCCH when the UE has not received any UL grant allocating the transmission resources during the specified time period.

* * * * *